United States Patent Office 3,203,063
Patented Aug. 31, 1965

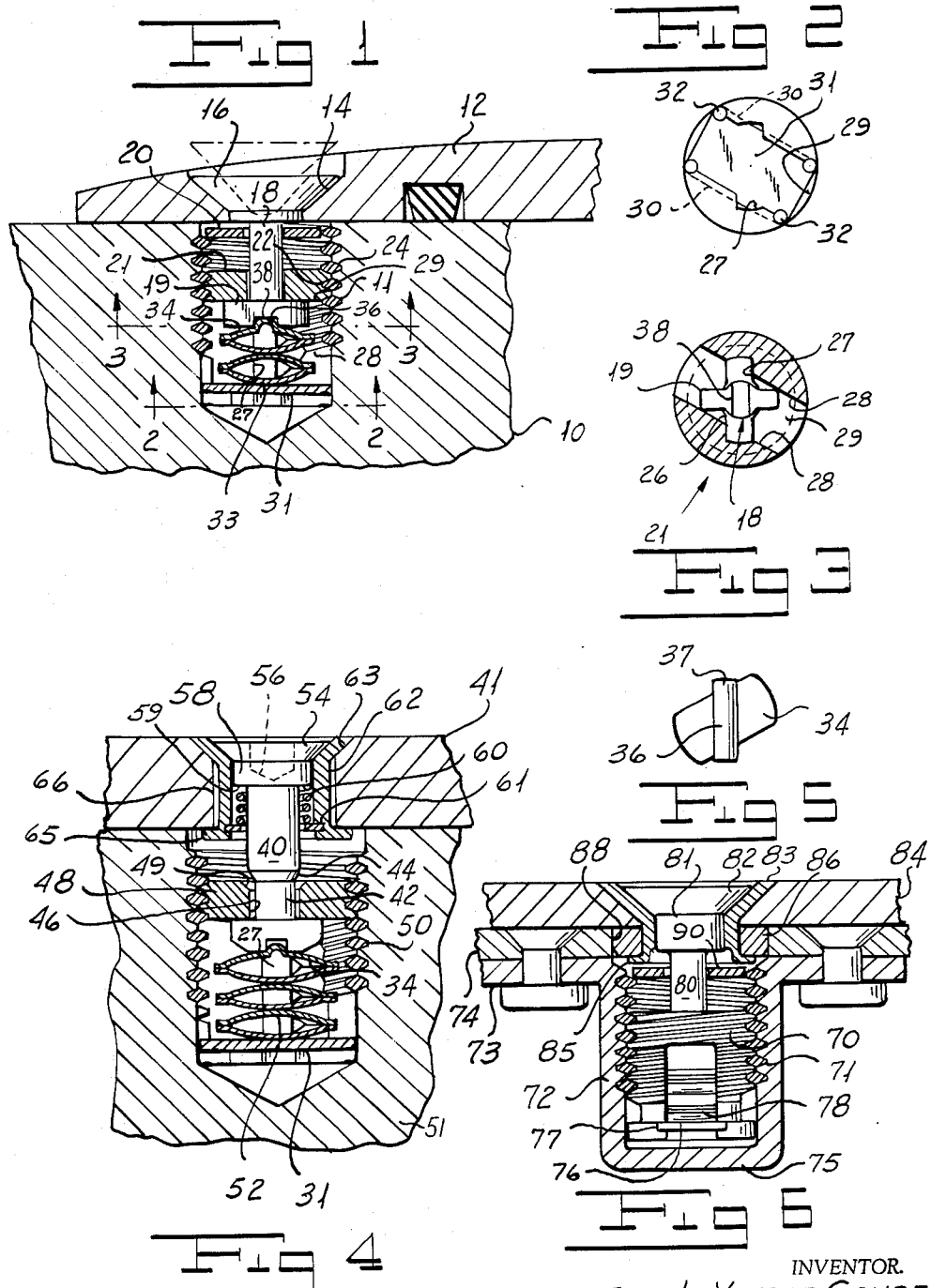

3,203,063
ROTATABLE STUD FASTENER
John L. Vander Sande, North Haledon, N.J., assignor to Camloc Fastener Corporation, Paramus, N.J., a corporation of New York
Continuation of application Ser. No. 33,712, June 3, 1960. This application Feb. 21, 1963, Ser. No. 260,279
5 Claims. (Cl. 24—221)

This application is a continuation of copending application serial No. 33,712 filed June 3, 1960, now abandoned.

This invention relates to rotary stud fasteners and relates more particularly to a novel quick-acting fastener for sheets and other members which can be rotated to fully fastened condition in less than one full turn and wherein the stud is a two-piece structure with a secure interlock therebetween, the outer or headed section being carried by the outer sheet in the usual fashion and the inner section being carried by and remaining in a receptacle secured to the inner sheet when the parts are unfastened.

One of the principal objects of the invention is to provide an improved fastener for attaching panels to structures and for other purposes wherein the fastening elements are quickly moved to fully locked position without any relaxation of tension, as opposed to fasteners employing a helical ramp and detent, and wherein the parts, when locked, are positively secured against reverse rotation to unlocked position.

The improved fastener of the present invention has particular usefulness in connection with stressed panels for aircraft wherein it is a common practice to use screws or bolts extending through match-drilled holes to engage a threaded self-locking nut plate riveted to the rear surface of the structure. This common type of arrangement allows for pulling the sheets tightly together only after a comparatively large number of revolutions and depends largely upon friction built up in the plate nut for preventing unscrewing of the bolt due to vibration or other factors.

The shear stresses to which a stressed panel is subjected must be resisted by structural reinforcement around the opening and accordingly it becomes necessary to employ a comparatively large number of fasteners around the opening.

The fastener of the present invention is an improvement on the stressed panel fasteners disclosed in Patents Nos. 2,878,542 and 2,881,499, particularly in that it is designed for use in very small areas, especially in missile applications. In a typical use, the tapped hole in the structure to which a sheet was to be secured could not exceed about ⅜" in depth nor about 5/16" in diameter, a requirement obviously incapable of being fulfilled by the fasteners of said two patents, or any of the other existing stressed panel fasteners employing two-part studs.

A further object of the invention is to provide a two-part stud for a quick acting fastener which is of simple design and which is easy to fabricate because of the absence of any intricate configurations or unusual contours.

Another object of the invention is to provide an improved rotatable stud for a fastener structure of the type described which requires no intricate casting techniques in its fabrication and which can be manufactured inexpensively with conventional machine tools. While the fastener of the present invention can be constructed in much smaller sizes than existing fasteners, it is equally well suited for fasteners of normal size where space is not at a premium.

In the drawing:

FIG. 1 is a broken section taken through the miniaturized fastener of the present invention and showing a typical installation therefor.

FIG. 2 is a bottom plan view of the fastener installation, the view being taken on line 2—2 of FIG. 1.

FIG. 3 is a section taken on line 3—3 of FIG. 1.

FIG. 4 shows the fastener in a modified installation.

FIG. 5 is a plan view of a combined spring and detent plate.

FIG. 6 is a fragmentary sectional view of a modified fastener of the present invention wherein a separate receptacle is employed.

The fastener in FIGS. 1-5 is shown as installed in a structure 10 which may comprise a special casting having a tapped hole 11 which, in this case, forms the fastener receptacle. A removable sheet 12 to be secured to the structure has a countersunk opening 14 to receive the head 16 of a stud having a round shank 18, the latter having a cross-pin element 19 at its inner end. The stud is retained captive in the outer sheet by a split retaining washer 20. The flush head arrangement shown is illustrative only and the invention may be embodied in a round head, a button head, or a head of any other configuration.

The stud extension comprises a specially formed rotatable insert 21 having external threads 22. The insert is received for rotation in a helical thread coil 24 which is seated within threaded opening 11 in the casting. This thread coil is preferably not round but has some inwardly offset sections (not shown) which restrain rotation of the stud extension. Even without the inwardly offset sections the coil can be formed with a suitable cross section which effectively limits the free rotation of the stud extension.

This member has a central opening 26 extending axially from end-to-end and which is provided with opposed lateral extensions 27 of such size as to permit the cross-pin element to pass freely therethrough. The member is further formed at its lower end with a relatively wide transverse milled slot forming spaced vertical walls 28 and an upper wall 29, as seen in FIG. 3.

The lateral extensions 27 of the opening are disposed at an angle of about 45° to the planes of walls 28 and these walls act as stops limiting rotation of the stud relative to the stud extension. If desired the cylindrical blank from which the stud extension is made may first be threaded, then the transverse slot formed by a milling operation, then central opening 26 is drilled, and finally the lateral extensions 27 are formed by a broaching operation. After this is done the only further operation is to form two opposed trackways or slots 30 at the lower end of the insert which receive a plate or spring retainer 31 which is secured in place by staking, as shown at 32.

The stud is urged outwardly and is also restrained against rotation from locked position by means of a spring assembly and detent means positioned between the stud and receptacle. Either the stud or the spring assembly may have the detent and in the arrangement shown the assembly comprises one or more pairs of curved spring plates 33. All plates 33 below the uppermost are generally smooth. The pairs below the uppermost pair are arranged in opposed relation. The uppermost plate 33 is arranged in opposed relation to a spring 34 which has an upwardly extending rib or crest 36 which forms a detent and enters a recess 38 at the lower end of stud 18. These plates have a width only slightly less than the distance between walls 28 and thus are firmly secured against rotation. Each of the spring plates further has ears 37 extending outwardly along opposed longitudinal edges thereof which enter lateral extensions 27 of the opening in the insert 21. These ears secure the plates against slipping out of the transverse slot. In the alternative arrangement earlier mentioned the upper spring plate would have the female component and the stud have the male component, as shown in FIG. 4 of Patent No. 2,881,499.

In assembling the fastener, the thread coil is first installed in thread form 11 by means of a special helix constricting tool used for that purpose. The spring plates 33 and 34 are next moved into the transverse slot of the insert, the retainer slid in place from the ends of the trackways and the latter staked in place. The assembled stud extension is now screwed into the threaded opening. The plate 12 carrying stud 18 is now inserted in place and the cross pin moved through openings 27 and the stud is rotated. After a quarter turn the ends of the cross pin contact walls 28. The rib 36 aligned with the recess 38 may enter the recess. Further rotation causes the stud extension to turn while overcoming the resistance to rotation caused by the thread coil.

After one or more turns, depending upon the position of the insert within the threaded opening 11 at the time the stud was inserted, the outer sheet 12 becomes tightly secured to the structure as soon as the upper faces of the cross pin engage upper wall 29 of the transverse slot forming vertical walls 28.

Upon reverse rotation, one quarter of a turn causes the cross pin to back off insert wall 29 and the cross pin now is aligned with openings 27 and the stud is free to be removed therefrom. It is preferred, however, to continue this reverse rotation for at least another half turn so that upon re-engagement the upper faces of the cross pin 19 are assured of passing under wall 29 of the slot in the insert. If it does not do so before rotation of the stud commences, this rotation causes the stud extension to advance without interlocking engagement and could conceivably move the latter right out of the thread section if there were no stop at the lower end.

In the modified arrangement of FIG. 4 the main stud section 40 carried by upper sheet 41 has a reduced section 42 with a conical section 44 therebetween. The opening 46 in the inesrt 48 has a complementary chamfer 49. The insert is otherwise substantially the same as in the first form and is rotatably mounted in the thread coil 50 carried in the threaded opening in the structure 51. In this instance three sets of spring plates 52 are employed.

The stud here has a head 54 with a wrench-receiving opening 56 and an enlarged section 58 below the head which forms a shoulder 59 against which one end of a spring 60 acts, the other end of the spring engaging a split retaining ring 61 which is received in a slot in a cup 62 having a flared upper end 63 to receive the head in flush relation. The lower end of the cup is rolled outwardly at 65 to secure it within opening 66 in the upper sheet.

In the further modified form of FIG. 6 the insert 70 is carried in a thread coil 71 in a separately formed cylindrical receptacle 72 having ears 73 for attachment to the fixed structure 74. Although the lower wall 75 of this receptacle forms a stop it is nevertheless preferred again to have the retainer plate 76, mounted in slots 77, hold the spring plates 78 in their upward position. In this instance the stud 80 again has an enlarged section 81 below head 82, and the head is received in flush relation in a cup 83 carried by upper sheet 84. The outwardly rolled lower end 85 of the cup engages a bushing 86 positioned within an enlarged opening 88 in the fixed structure 74. Again, a split washer 90 retains the stud captive in the upper sheet.

The rotation restraining arrangement comprising the round or out-of-round thread coil is suggestive only and a locking plug formed from plastic material may also be used. Such a plug, currently available under the trademark "Nylok," is positioned in the thread section of the receptacle and extends into the thread path.

The terms "upper" and "lower" are used in the appended claims in order to maintain consistency with the views in the drawing and are not so used in any limiting sense.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A fastener assembly for securing two members, one of which has a threaded recess in assembled relationship including in combination a receptacle comprising a body having a longitudinal axis and having external screw threads along its length, said body being provided with a pair of legs having walls forming a first slot extending through said body and from one end thereof for a distance along the longitudinal axis to provide a slot base, means forming a second slot extending axially through said body into and along the walls of said first slot, said body being disposed in said recess, a fastener element carried by the other member, said fastener element having a T-head adapted to be inserted into said receptacle through said second slot, said fastener element being adapted to be rotated to bring said head into engagement with the walls of said first slot, spring means disposed in said recess below said T-head, and interengageable detenting means between said head and said spring means adapted to engage in response to the action of said spring means when said head engages said walls releasably to retain said fastener element in a position with its head in engagement with the walls of said second slot.

2. A quick-acting fastener comprising a stud formed with a cross pin at its lower end, an internally threaded receptacle and an externally threaded stud extension mounted within said receptacle and provided with means for interlocking engagement with the stud upon partial rotation thereof, said stud extension being of generally cylindrical shape and having a central opening to receive the stud and formed with lateral extensions to pass the cross pin therethrough and also having a transverse slot extending upwardly from its lower end over the major portion of its depth and forming opposed vertical walls and an upper wall, said lateral extensions lying at less than a right angle to said opposed vertical walls, said walls acting as stops for the cross pin when the stud has been passed through said central opening and then rotated while the upper faces of the cross pin are below said upper wall, spring means urging the stud upwardly, said spring means comprising generally rectangular superimposed springs disposed in the area between said vertical walls, a support for the springs at the lower end of the extension, and detent means for resisting rotation of the stud when the parts are in fastened condition, said detent means being formed in part by the spring means and in part by the lower end of the stud.

3. A quick-acting fastener for securing two superimposed structures together and comprising a stud with an enlarged head carried in an opening in the upper structure and formed with a cross pin at its lower end, an internally threaded receptacle associated with the lower structure, and an externally threaded stud extension provided with means for quick interlock with the stud mounted within said receptacle, said stud extension being of generally cylindrical shape and having a straight transverse slot extending across its full width and upwardly from its lower end and over a major portion of its depth and providing a flat upper wall and opposed flat vertical walls, said stud extension further having a central opening to receive the stud and formed with lateral extensions lying at less than a right angle to said vertical walls and extending downwardly to the lower end of said stud extension thus forming recesses in said vertical walls, said vertical walls acting as stops for the cross pin when the stud has been passed through said central opening and then rotated while the upper faces of the cross pin are below said flat upper wall, spring means urging the stud upwardly, said spring means comprising a plurality of superimposed generally rectangular springs which fit between said vertical walls and have opposed arched contours and side extensions which fit within said vertical wall recesses and prevent removal of the springs laterally of the transverse slot, the lower end of the slot having opposed trackways, a plate supported in said trackways retaining the lowermost spring against downward movement, and detent means for resisting rotation of the stud when the parts are in fastened condition, said detent means being formed in part by the spring means and in part by the lower end of the stud.

4. A rotary stud structure comprising a headed stud provided with a cross pin at its lower end and an externally threaded stud extension provided with means for quick interlock with the stud, said stud extension further having a central opening to receive the stud and formed with lateral extensions to pass the cross pin therethrough and also having a transverse slot extending upwardly from its lower end over the major portion of its depth and forming opposed vertical walls and an upper wall, said lateral extensions lying at less than a right angle to said vertical walls and extending downwardly to the bottom of said stud extension, thus forming recesses in said vertical walls, said walls acting as stops for the cross pin, a plurality of superimposed curved spring plates having side extensions which fit within said vertical wall recesses and prevent lateral movement of the springs, a support for the lowermost spring, and detent means for resisting rotation of the stud when the parts are in fastened condition, said detent means being formed in part by the spring means and in part by the lower end of the stud.

5. A stud structure for a rotary stud fastener and comprising a stud with a head at its upper end and a cross pin at its lower end, and an externally threaded stud extension provided with means for quick interlock with the stud, said stud extension being of generally cylindrical shape and having a transverse slot extending across its full width and upwardly from its lower end over a major portion of its depth and providing an upper wall and opposed vertical walls, said stud extension further having a central opening to receive the stud and formed with lateral extensions lying at less than a right angle to said vertical walls and extending downwardly to the lower end of said stud extension, thus forming recesses in said vertical walls, said walls acting as stops for the cross pin when the stud has passed through said central opening and then rotated while the upper faces of the cross pin are below said flat upper wall, spring and detent means between the extension and the stud to restrain rotation of the stud, said spring means comprising a plurality of superimposed spring plates having side extensions which fit within the side wall recesses and prevent lateral movement of the springs, and a support for the lowermost spring plate carried by the extension, said detent means being formed in part by the spring means and in part by the lower end of the stud.

References Cited by the Examiner
UNITED STATES PATENTS

| | | | |
|---|---|---|---|
| 2,839,808 | 6/58 | Zahodiakin | 24—221.2 |
| 2,900,697 | 8/59 | Cuss | 24—221.2 |
| 2,922,211 | 1/60 | Boyd | 24—221.2 |

DONLEY J. STOCKING, *Primary Examiner.*